United States Patent [19]

Hawkins

[11] Patent Number: 5,550,715
[45] Date of Patent: Aug. 27, 1996

[54] EXTERNAL LIGHT SOURCE FOR BACKLIGHTING DISPLAY

[75] Inventor: Jeffrey C. Hawkins, Redwood City, Calif.

[73] Assignee: Palm Computing, Inc., Los Altos, Calif.

[21] Appl. No.: 165,363

[22] Filed: Dec. 10, 1993

[51] Int. Cl.$^6$ .................................................. F21V 8/00
[52] U.S. Cl. ........................... 362/31; 362/27; 362/191; 362/330
[58] Field of Search .............................. 359/48, 49, 50; 362/26, 27, 28, 31, 327, 328, 330, 157, 226, 812, 190, 191; 40/541, 564, 582, 583

[56] References Cited

U.S. PATENT DOCUMENTS

| | | | |
|---|---|---|---|
| 2,994,971 | 8/1961 | Meisenheimer et al. | 362/26 |
| 3,132,810 | 5/1964 | Ostensen | 362/31 |
| 3,957,351 | 5/1976 | Stockwell | 359/49 |
| 4,042,919 | 8/1977 | Patty | 40/564 |
| 4,435,743 | 3/1984 | Plumly | 362/31 |
| 4,748,756 | 6/1988 | Ross | 40/564 |
| 4,775,222 | 10/1988 | Ohe | 362/26 |
| 4,830,899 | 5/1989 | Nakahashi et al. | 362/31 |
| 5,008,658 | 4/1991 | Russay et al. | 359/48 |
| 5,196,964 | 3/1993 | Heine et al. | 362/157 |
| 5,226,105 | 7/1993 | Myers | 362/31 |

FOREIGN PATENT DOCUMENTS

| | | | |
|---|---|---|---|
| 123823 | 7/1985 | Japan | 359/49 |
| 194231 | 8/1988 | Japan | 359/48 |

*Primary Examiner*—Denise L. Gromada
*Assistant Examiner*—Alan B. Cariaso
*Attorney, Agent, or Firm*—Fish & Richardson P.C.

[57] ABSTRACT

A method and apparatus for backlighting a transflective display within a hand-held computing device. An external light source and a power supply, dedicated to the light source, shines light through an input in a side of a computing device. The light which shines through the input is directed through the display by a light directing means. Light is conducted by a light conducting panel positioned along the back surface of a transflective display upon which text and images may be presented. The light so conducted shines through the transflective display, allowing a user to see images presented on the display even in subdued ambient light. Removal of the light source has no impact on the operation of the computing device other than to remove light which may only be necessary for viewing the display in low ambient light conditions.

11 Claims, 2 Drawing Sheets

EXTERNAL LIGHT SOURCE FOR BACKLIGHTING DISPLAY

BACKGROUND OF THE INVENTION

1. Field of the Invention

This invention relates to a method and apparatus for illuminating a display, and more particularly to a method and apparatus for externally supplying light to illuminate a transflective display within a hand-held computing device.

2. Description of Related Art

As computers and computing devices continue to be presented in ever smaller form factors, the size of displays and power supplies becomes an increasing concern. In particular, there is presently a new wave of computing devices which attempt to emulate the power of a personal computer in a form factor which can be conveniently held in one's hand, such as the "Wizard" manufactured by Sharp Corporation, and the "Zoomer" manufactured by Casio Corporation. Typically, such computing devices comprise a reflective or transflective display element, such as a liquid crystal display. A reflective display relies entirely on ambient light to allow the user to see an alphanumeric and/or graphical display. Transflective displays may be backlit by placing a light source behind the display. Backlighting a transflective display allows a user to see the display with little or no ambient light.

The problem with present backlighting schemes is that they consume relatively large amounts of power which could otherwise be used to perform computing functions. Accordingly, the user must either sacrifice (1) size and weight (i.e., the computing device must be made larger and heavier to accommodate larger power supplies), (2) visibility in low ambient light conditions, or (3) battery life.

Therefore, there is a need for an apparatus which allows a user to see images presented on a transflective display of a hand-held computing device without sacrificing battery life, or increasing the size or weight of the computing device. The present invention provides such an apparatus.

SUMMARY OF THE INVENTION

The present invention is a method and apparatus for backlighting a transflective display within a hand-held computing device. In accordance with the present invention, an external light source and a power supply which is preferably dedicated to the light source, shines light through an opening or input in a side of a computing device. The light which shines through the opening or input is directed through the display by a light directing means. In the preferred embodiment, light is conducted by a light conducting panel, such as a light pipe, positioned along the back surface of a transflective display upon which text and images may be presented to a user of the computing device. The light so conducted shines through the transflective display, allowing the user to see the text and images presented on the display even in subdued ambient light. In an alternative embodiment of the present invention, the light directing means is a reflective element which causes the light to be directed through the display. The light source is preferably removably attached to the computing device. Removal of the light source has no impact on the operation of the computing device other than to remove light which may only be necessary for viewing the display in low ambient light conditions.

The details of the preferred embodiment of the present invention are set forth in the accompanying drawings and description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

The present invention is a method and apparatus for illuminating a transflective display of a hand-held computing device.

Figure 1:
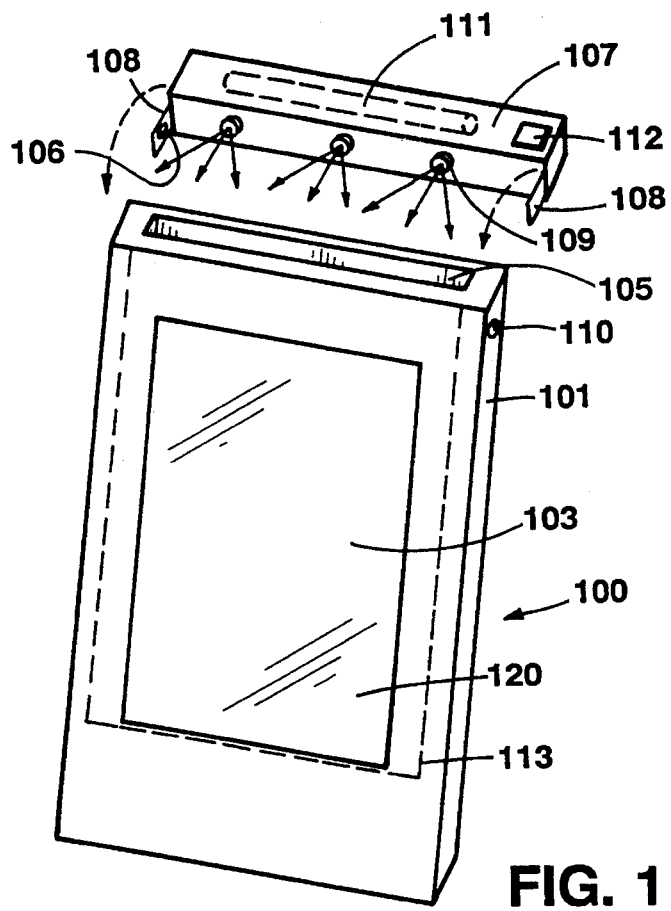
FIG. 1 is a front perspective view of one embodiment of the present invention.

FIG. 1 shows a computing device 100 having a transflective display 103 and an opening 105, such as a slot or hole. In accordance with the preferred embodiment of the present invention, the opening 105 is provided in one or more sides of a case 101 enclosing the computing device 100 having a transflective display 103 with a viewing surface 120. Also shown in FIG. 1 is a light source 107 which can be removably affixed by a fastening means to the computing device 100 along a side having the opening 105. In one embodiment of the present invention, the fastening means used to affix the light source 107 to the computing device 100 includes rounded protuberances 106 on resilient tabs 108 that snap into detentes 110 on the sides of the case 101. Any other means for removably affixing the light source 107 to the computing device 100 is within the scope of the present invention. For example, a protrusion from the light source 107 may lock into a slot or hole in the case 101 of the computing device 100, or vice versa, a thumb screw captivated in the light source 107 may be threaded into the case 101, hook and loop material may be respectively applied to the light source 107 and the case 101, etc.

A viewing surface 120 of the transflective display 103 is exposed to allow the user of the computing device 100 to view characters or images on the display 103. The light source 107 comprises at least one light emitting element 109 and a battery 111 electrically connected to illuminate the light emitting element 109. The light emitting element 109 may be an incandescent, fluorescent, halogen, LED, electroluminescent, or other light emitting element. The battery 111 is preferably used only to power the light emitting element 109, but may, in an alternative embodiment, also provide power to the computing device through mutual electrical contacts provided therefor. The battery 111 may be of any convenient size, such as one or more disposable or rechargeable pen light batteries, and of any kind, wet cell or dry cell, including (for example only) carbon zinc, mercury, alkaline, NiCd, lithium, and nickel hydride.

When the light source 107 is affixed to the computing device 100, light emitted by the light emitting element 109 shines through the opening 105 and into the computing device 100. An electrical switch 112 of any type may be used to connect the battery 111 to the light emitting element 109 to cause the light emitting element 109 to shine.

Figure 2:
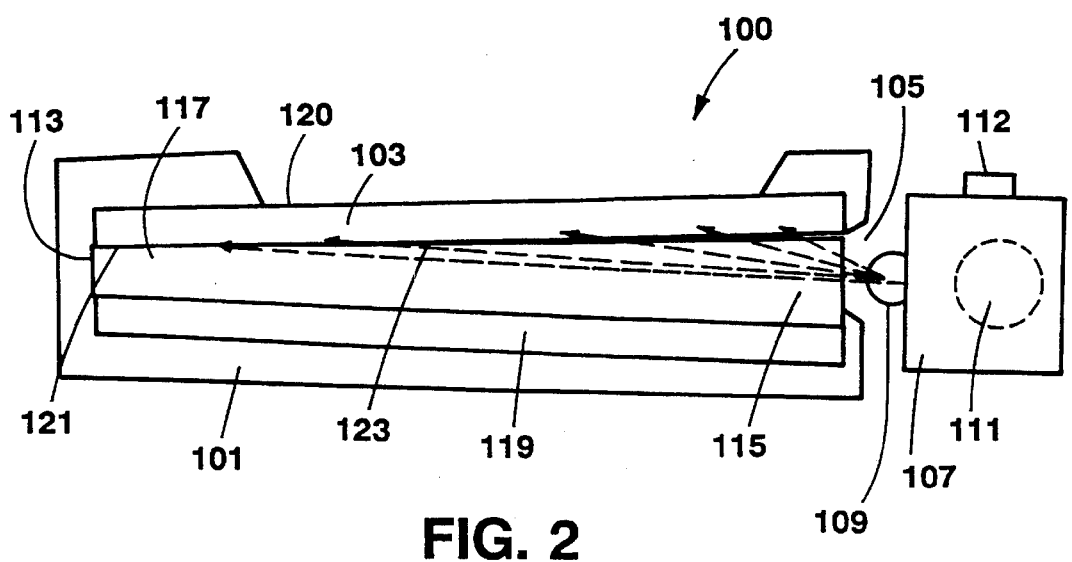
FIG. 2 is a cross-sectional view of the embodiment shown in FIG. 1.

FIG. 2 is a cross-sectional view of the computing device 100. In one embodiment of the present invention, light emitted by the light emitting element 109 is conducted from the opening 105 to the proximal end of the display 103 by a light directing means such as a light conducting panel 113, and more particularly, a light pipe. Light so conducted is preferably emitted in generally equal intensity along the front surface of the light conducting panel 113 which is in contact with, or in proximity to, the rear surface 121 of the display 103. In one embodiment of the present invention, a substrate 119 upon which are mounted electronic components of the computing device 100 is disposed behind the light conducting panel 113.

The light conducting panel 113 may be made of a number of well known light guide materials. As is well known, such materials generally use near-total internal reflection to guide input light to a desired output. The light conducting panel 113 may be a solid panel, or may be a bundle of optical fibers, the proximal ends of which are gathered at or near the opening 105, and the distal ends of which are distributed along the rear of the display 103.

The light conducting panel 113 may be configured in any one of a number of configurations to allow the light to be evenly diffused across the rear surface 123 of the display 103, thus allowing the light to shine through the display with approximately equal intensity at all points on the display. For example, the light conducting panel 113 may be thicker at its proximal end 115 than at its distal end 117, as shown in FIG. 2. Furthermore, the light conducting panel 113 may have a textured surface which diffuses light to be emitted through the light conducting panel 113 and the display 103, providing more even rear illumination of the display 103. For example, either the rear surface and/or the front surface may be textured.

The mating surfaces of the light source 107 and computing device 100 may be flush to one another. Alternatively, part of the light source 107 may be inserted into the opening 105 to illuminate an edge or surface of the light conduction panel 113, or the light conducting panel 113 may protrude through the opening 105 to mate with and receive light from the light source 107.

By providing the light emitting element 109 and the battery 111 in a removable external light source 107, the display 103 can be back-illuminated without affecting the battery life of the computing device 100, or the size of the power supply required to power the computing device 100. Furthermore, standard size batteries and light emitting elements may be used to illuminate the display 103 without increasing the size of the computing device 100.

Figure 3:
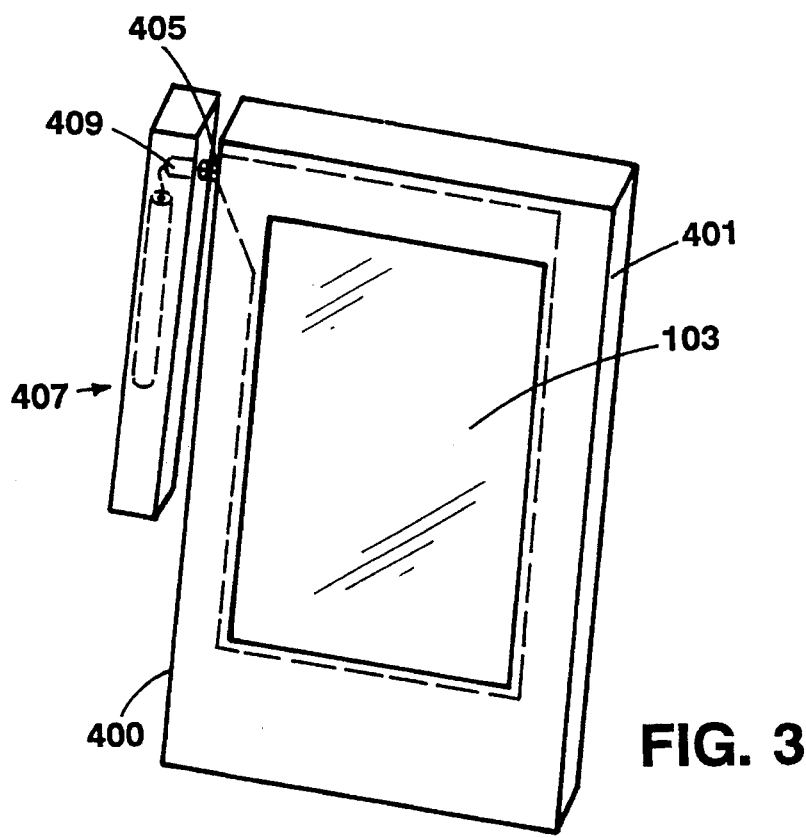
FIG. 3 is a front perspective view of a second embodiment of the present invention.

FIG. 3 shows an alternative embodiment in which a light source 107 is affixed to a side of a case 101 of a computing device 100. An opening 105 in the side of the computing device 100 allows light from a light emitting element 109 to be either conducted or reflected at an angle from the direction of entry and through an internal light conducting panel (not shown) along the rear surface of a display 103. Thus, the light exits through the display 103, thereby backlighting the display 103.

It should be obvious to one of ordinary skill that the opening 105 may be placed at nearly any location on the case of a computing device (e.g., top edge, rear surface, side, etc.), so long as the incoming light is conducted or reflected to shine through the rear of the display 103.

Figure 4:
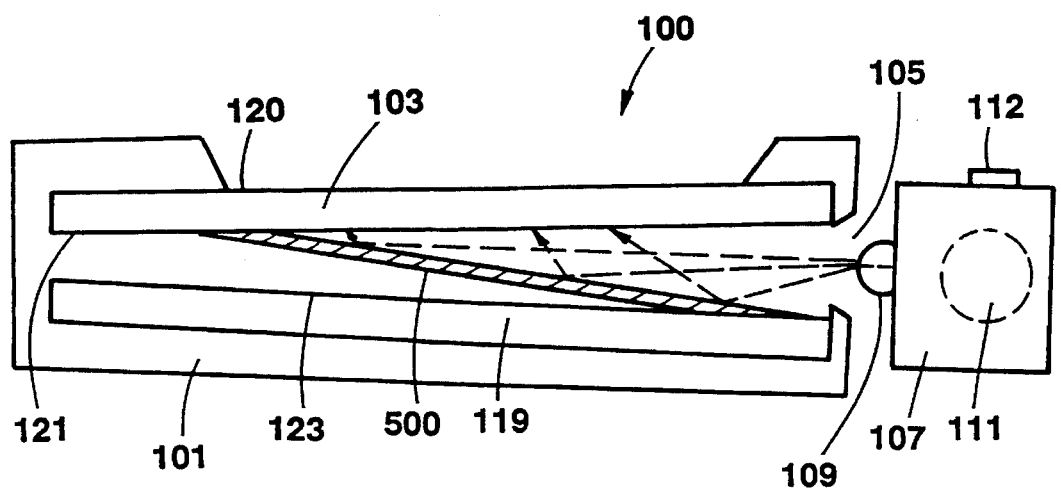
FIG. 4 is a cross-sectional view of a third embodiment of the present invention.

FIG. 4 is an illustration of an alternative embodiment of the present invention in which light from the light emitting element 109 is reflected from the light source 107 through the rear 121 of the display 103. In this embodiment, the light directing means is a light reflecting element 500, such as a mirror, fashioned to cause the light to be diffused and reflected with generally equal intensity through each point on the display 103. The light reflecting element 500 is preferably shaped such that the light from a point source would be spread approximately equally through the display 103. In one embodiment, a diffusion plate (not shown) having a textured surface could be disposed between the light reflecting element 500 and the display 103 to further assist in distributing the light from the light emitting element 109 evenly through the display 103.

In an alternative embodiment of the present invention, a light conducting element which guides light from an external light source is removable. The removable light conducting element may slide into an opening in a case of a computing device, and may be attached to or separated from the external light source 107. The opening into which the light conducting element enters may be the same opening through which light enters to illuminate the display.

The light conducting element may alternatively be mounted on a removable rear panel to a case of a computing device. By removing a rear panel of the case which is streamlined to provide the smallest profile, and attaching in its place a rear panel comprising a light conducting element, the display can be backlit by an external light source within the rear panel.

In another alternative embodiment, light from an external light source (powered by an external power supply) shines through an opening in the rear of the case. A lens is placed generally centrally in an opening or hole in a component substrate (i.e., a circuit board on which electrical components related to the computing function are mounted). The lens focuses light that enters through the opening in the case onto the rear of the display, thus backlighting the display.

A number of embodiments of the present invention have been described. Nevertheless, it will be understood that various modifications may be made without departing from the spirit and scope of the invention. For example, the display may be any type which would benefit from backlighting. The type of light emitting element is governed only by design and engineering considerations, such as size, cost, power consumption, and intensity. The manner in which the light source is affixed to the computing device is not significant, providing the light source is relatively easily removable. The type of computing device with which the display is being used in not significant. The type of power used to illuminate the light emitting element is not significant. Furthermore, the light conducting panel or reflective elements may be configured or shaped in a number of configurations and shapes to conduct light from the light emitting element through the rear of the display. Accordingly, it is to be understood that the invention is not to be limited by the specific illustrated embodiment, but only by the scope of the appended claims.

I claim:

1. A display illuminating system for a computing device, comprising:

a. a case having a transflective display and a light transmitting input;

b. at least one light emitting element, positioned externally from the case and removably affixed thereto, for emitting light into the light transmitting input; and c. a light directing element comprising a light conducting panel disposed within the case and positioned with respect to the light transmitting input and transflective display so as to receive light emitted by the light emitting element into the light transmitting input and directing such light through the transflective display, thereby illuminating the display.

2. The system of claim 1, further including a self-contained power source coupled to the light emitting element.

3. The system of claim 2, further including an electrical switch for selectively coupling the light emitting element and the self-contained power source.

4. The system of claim 2, wherein the self-contained power source is a battery.

5. The system of claim 1, wherein the light transmitting input comprises an opening in the case.

6. The system of claim 1, wherein the light conducting panel is a light pipe.

7. The system of claim 1, wherein the light conducting panel is thicker at a proximal end of the panel than at a distal end of the panel.

8. The system of claim 1, wherein at least one surface of the light conducting panel is textured to distribute illumination more evenly over the rear of the display.

9. A computing device including:
  a. a transflective display having a viewing surface and a rear surface;
  b. a case enclosing the display such that the viewing surface of the display is exposed, and having a light transmitting input;
  c. a light source, positioned externally from the case and removably affixed thereto, including at least one light emitting element for shining light into the light transmitting input; and
  d. a light directing element comprising a light conducting panel disposed within the case for directing light emitted by the light emitting element through the rear surface of the display and out the viewing surface of the display, thereby illuminating the display.

10. A method for illuminating a transflective display in a display illuminating system for a computing device, wherein the display illuminating system comprises:
  a. a case containing the transflective display and a light transmitting input;
  b. at least one light emitting element, positioned externally from the case and removably affixed thereto, for emitting light into the light transmitting input; and
  c. a light directing element comprising a light conducting panel disposed within the case and positioned with respect to the light transmitting input and the transflective display so as to receive light emitted by the light emitting element into the light transmitting input and directing such light through the transflective display, thereby illuminating the display, wherein the display has a viewing surface, including the step of:
  shining light from the light emitting element into the light transmitting input in the case, such that the light is directed through a rear surface of the display by the light directing element and exits through the viewing surface of the display.

11. A method for illuminating a transflective display of a computing device having a case having a transflective display having a viewing surface and a light transmitting input, at least one light emitting element, positioned externally from the case and removably affixed thereto, for emitting light into the light transmitting input, and a light directing element comprising a light conducting panel disposed within the case and positioned with respect to the light transmitting input and transflective display so as to receive light emitted by the light emitting element into the light transmitting input and direct such light through the transflective display, including the step of:
  shining light from the light emitting element into the light transmitting input in the case, such that the light is directed through a rear surface of the display by the light directing element and exits through the viewing surface of the display.

* * * * *